United States Patent
Ridgeway et al.

(10) Patent No.: US 6,447,580 B1
(45) Date of Patent: Sep. 10, 2002

(54) ELECTROSTATIC PRECIPITATOR

(76) Inventors: R. F. Ridgeway, 7025 Blackoak Dr., Reynoldsburg, OH (US) 43068; J. F. Mainieri, 2465 Mt. Herman Rd., Granville, OH (US) 43023; John D. Hume, 1207 Harrison Pond Dr., New Albany, OH (US) 43054

(*) Notice: Subject to any disclaimer, the term of this patent is extended or adjusted under 35 U.S.C. 154(b) by 0 days.

(21) Appl. No.: 09/915,799
(22) Filed: Jul. 26, 2001

Related U.S. Application Data (62) Division of application No. 09/299,538, filed on Apr. 26, 1999.

(51) Int. Cl.$^7$ ............................................. B03C 3/145
(52) U.S. Cl. ............................... 96/30; 96/57; 96/60
(58) Field of Search ..................... 96/60, 63, 55, 96/66, 52, 57, 30, 74; 95/63, 69, 78

(56) References Cited

U.S. PATENT DOCUMENTS

| | | | |
|---|---|---|---|
| 1,016,476 A | 2/1912 | Cottrell | 95/58 |
| 1,200,887 A | 10/1916 | Schmidt | 423/200 |
| 1,298,409 A | 3/1919 | Schmidt | 95/69 |
| 1,357,466 A | 11/1920 | Moller | 95/79 |
| 1,381,660 A | 6/1921 | Rathbun | 95/57 |
| 1,507,687 A | 9/1924 | Schmidt | 95/79 |
| 2,049,561 A | 8/1936 | Grave | 204/573 |
| 2,983,332 A | 5/1961 | Vicard | 96/60 X |
| 2,987,408 A | 6/1961 | Minnick | 106/709 |
| 3,669,701 A | 6/1972 | Biederman, Jr. | 106/706 |
| 3,765,920 A | 10/1973 | Humphrey | 106/405 |
| 3,782,985 A | 1/1974 | Gebhardt | 106/679 |
| 3,830,776 A | 8/1974 | Carlson et al. | 523/218 |
| 3,898,060 A | 8/1975 | Starbuck | 96/31 |
| 3,979,168 A | 9/1976 | Chauvin | 425/6 |
| 4,050,950 A | 9/1977 | Brewer et al. | 106/706 |
| 4,121,945 A | 10/1978 | Hurst et al. | 106/405 |
| 4,210,457 A | 7/1980 | Dodson et al. | 106/675 |
| 4,244,709 A | 1/1981 | Chang | 95/79 |
| 4,283,223 A | 8/1981 | Billard | 75/10.67 |
| 4,308,036 A | 12/1981 | Zahedi et al. | 95/68 |
| 4,352,856 A | 10/1982 | Smillie | 428/329 |
| 4,374,652 A | 2/1983 | Zahedi et al. | 95/69 |
| 4,698,289 A | 10/1987 | Aldrich et al. | 430/106.6 |
| 4,776,864 A | 10/1988 | Werner | 96/55 |
| 4,894,305 A | 1/1990 | Hagenbach | 430/106.6 |
| 5,106,422 A | 4/1992 | Bennett et al. | 106/705 |
| 5,137,546 A | 8/1992 | Steinbacher et al. | 96/52 X |
| 5,160,351 A | 11/1992 | Schmidt et al. | 96/30 X |
| 5,160,510 A | 11/1992 | Steinbacher et al. | 95/64 |
| 5,217,511 A | 6/1993 | Plaks et al. | 96/55 |
| 5,540,756 A | 7/1996 | Hoppitt et al. | 95/69 |
| 5,624,491 A | 4/1997 | Liskowitz et al. | 106/705 |
| 5,961,693 A | 10/1999 | Altman et al. | 96/66 X |

Primary Examiner—Richard L. Chiesa
(74) Attorney, Agent, or Firm—Sand & Sebolt (57) ABSTRACT

A low density ash particle separation and collection method and device for separating low density particles, primarily frothy-solid particles with internal and external porosity and thick walled hollow particles, from the overall mixture of higher density particles including raw fly ash as produced by coal fired power plants. Specifically, the invention relates to a device and method for separating and collecting the low density fly ash fraction composed of thick walled hollow fly ash particles and frothy generally solid particles with both internal and external porosity and a relatively small amount of cenospheres from the overall mixture of ash particles composing raw ash as produced by coal fired power plants by de-energizing one or more fields of large electrostatic precipitators during electrostatic precipitation of the ash resulting in the dropping out of the lower density particles in the hoppers located below the de-energized field(s) of the electrostatic precipitator.

7 Claims, 5 Drawing Sheets

ELECTROSTATIC PRECIPITATOR

CROSS REFERENCE TO RELATED APPLICATION

This application is a division of allowed co-pending U.S. patent application Ser. No. 09/299,538, filed Apr. 26, 1999, the entire specification of which is incorporated herein by reference.

BACKGROUND OF THE INVENTION

1. Technical Field

The invention relates to a method and apparatus for separating the lower density fly ash particles from the overall mixture of various density particles contained in raw coal ash. More particularly, the particles of fly ash separated and collected by this method include generally solid particles with pervasive internal and external porosity that are frothy in appearance, thick walled hollow particles with a specific gravity in the range of from 1.0 to 2.0 and a minor amount of thin walled hollow particles with a specific gravity of less than 1.0 known as cenospheres. Specifically, the method involves changing the momentum of the exhaust gas; either by drastically changing the diameter of the feed stream to drastically change the velocity of the gas, or by de-energizing at least the first static electric charging field of an electrostatic precipitator (ESP) through which the exhaust gases pass on their way to the stack of the power plant whereby these hollow, porous and other low density particles fall out and are collected in a collection hopper.

2. Background Information

Various types of filler materials have been used for decades to improve the properties and lower costs of various industrial and consumer products including concrete blocks; plastic composites such as shower stalls, automobile body panels, sinks and countertops; roofing materials; tires and other rubber products; caulking compounds; paper; and a multitude of other applications. For example, in plastic composites these fillers are commonly utilized to enhance their structural and mechanical properties, to improve the composite's fire resistance, to thicken or stiffen the pre-formed mix prior to molding and to reduce costs.

These fillers include natural or mineral fillers such as clay, talc and calcium carbonate, and synthetic fillers, such as glass beads, ground polymers and ceramics. Both mineral and synthetic fillers have proven to be useful fillers in materials ranging from ceramics to a variety of plastics including thermosetting plastics such as polyesters, epoxies and phenolics and thermoplastics such as polyethylene, polypropylene, acrylic lattices, as well as many other resin systems.

Generally, the selection of a filler for a specific application is based upon its physical characteristics (e.g. color, density, shape, thixotropic effect, reactivity, particle size distribution and handling features) and the mechanical properties of the filler (e.g. hardness and strength) and the resulting properties of the filled system. One of the important properties of a filler is its specific gravity.

When specific gravity is examined, two classes of fillers become apparent, namely high density mineral fillers, and low density materials, typically processed minerals or synthetic materials.

Most of the commonly used and economically priced fillers are high density minerals, usually having a specific gravity of 2.6 and higher. They are generally mined, are plentiful and include calcium carbonate (limestone), clay, silica and talc.

However, when the overall weight of the filled system is a concern, lower density fillers are much more desirable. As a result, the demand for economically priced low density fillers is increasing. Low density fillers are generally not plentiful in nature and therefore are man-made or derived by processing natural minerals. Low density fillers are generally expensive and include glass or plastic microspheres, hollow glass beads, expanded ceramic spheres and cenospheres.

Raw fly ash, a product created when coal is combusted in a generation facility is plentiful, and is being generated from coal fired power plants. More particularly, there are currently hundreds of coal fired power plants in the U.S. alone. These plants burn well in excess of one billion tons of coal per year, and as such, coal combustion by-products including fly ash have become one of the nation's most abundant resources. Growth is further expected as nuclear power loses preference to more standard power sources such as coal. As a result, the need to safely dispose of fly ash, and the need to develop an economical use for fly ash is ever increasing. Fly ash is currently used as a filler material in many applications but has never achieved the status of a major filler. Some of the reasons why fly ash have been unable to capture a large portion of the filler market are its color, its difficulty to handle due to dustiness, its wide particle size distribution, its hardness, and the inconsistency of its composition and properties. Most sources of fly ash have a specific gravity in the range of 2.1–2.3, which is less that than the common mineral filler, but this apparent advantage is not enough to offset the disadvantages.

Fly ash with a low specific gravity, whether hollow or solid has been usually separated from raw ash using water as the separation medium. Those particles having a specific gravity less than 1.0 will float and the remaining portion of the ash sinks to the bottom of the separation pond. The cenospheres must be collected from the ponds, usually by a skimming process, cleaned of other floating materials, dried, and often further processed. Cenospheres, when they are present in raw fly ash, typically represent one percent or less of the weight of the ash. However, cenospheres have a specific gravity of less that 1.0, and are very valuable as a low density filler, selling at a price significantly higher than other types of ash. Similarly, all low density ash, when cleaned and processed, is extremely valuable as a filler material.

Functionally, fly ash is the finely divided ash material carried in the stack gases from the furnace of power plants which consume powdered and pulverized coal, and is collected before it leaves the stack usually in an electrostatic precipitator or other type of collector. The problem associated with disposal of fly ash is large because the tonnage produced by some utility companies is quite high. Numerous attempts have been made to utilize the material, and the suggestion that lightweight aggregate materials might be prepared from fly ash is the result of such an attempt.

The present invention provides a method for economically separating a low density fraction of ash from the entire particulate range of fly ash created as a by-product from the combustion of coal. The resultant low density ash has a specific gravity of 1.6–1.99. More particularly, the resultant ash is at least ten percent lower in density than raw fly ash and produces very little dust when handled. Although not as light as the thin walled cenospheres, the ash created from the present invention is significantly more durable, and is primarily composed of a frothy, relatively solid particles with both internal and external porosity and larger thick walled hollow particles. In addition to its increased durability over cenospheres, the material created by the present invention is plentiful, comprising more than thirty percent of the total raw fly ash produced, and is less expensive to produce and process than cenospheres. The product created by the present invention thus has advantages when compared to both raw fly ash and cenospheres, making it a valuable low density filler produced in an economical manner.

The need thus exists for an ash that which is relatively inexpensive to produce, which may be separated from the existing raw fly ash with limited cost, and which provides for a low specific gravity for use as a filler material. The need also exists for an apparatus and system for separating the above described ash for collection and use as a filler material.

SUMMARY OF THE INVENTION

Objectives of the invention include providing an improved device, system and method of separating and collecting the lower density fly ash particles including semi-solid frothy particles with internal and external porosity, thick walled hollow particles and a smaller amount of thin walled hollow particles (cenospheres) from the other higher density solid particles contained in raw fly ash.

A further objective is to provide a low density ash particle separation and collection method and device that effectively separates the particles by size and density, without the use of water and subsequent de-watering and drying processes.

A further objective is to provide such a low density ash particle separation and collection method and device that lessens the amount of ash disposed in land fills.

A further objective is to provide such a low density ash particle which has both internal and external porosity.

A still further objective is to provide a mixture of low density ash particles having a size in the range of from 30 microns to 400 microns.

A further objective is to provide such a low density ash particle separation and collection method and device that produces an inexpensive source of low density mineral filler.

A further objective is to provide such a low density ash particle separation and collection method and device that produces large quantities of low density ash particles.

A further objective is to provide such a low density ash particle separation and collection method and device that produces a low density filler that is useful in plastics, ceramics, concrete and other materials.

A further objective is to provide such a low density ash particle separation and collection method and device that is inexpensive to operate and uses existing equipment such as electrostatic precipitators.

A further objective is to provide such a low density ash particle separation and collection method and device that incorporates one or more or all of the above objectives and advantages.

A further objective is to provide such a low density ash particle separation and collection method and device which accomplishes its objective in a dry environment.

A further objective is to provide such a low density ash particle separation collection method and device which substantially decreases the momentum of the gas stream in order to remove low density fly ash from the gas stream.

These and other objectives and advantages of the invention are obtained by the invention which includes a method of separating lower density ash from the exhaust gas stream which contain the entrained fly ash, and then collecting the low density ash that drops out below the de-energized fields of the electrostatic precipitator. The invention further includes an electrostatic precipitator or similar device that is designed in such a manner to cause the gas or air stream to rapidly decelerate causing the entrained particles to slow down and fall out suspension. The low density fly ash particles having less momentum (relative to their size and therefore subject to greater deceleration due to drag forces) tend to fall out sooner (i.e. in the inlet portion, first hoppers, of the precipitator or similar device). The denser ash particles, with greater momentum and affected to a lesser extent by drag forces, are carried further into the precipitator. The precipitator or other device is, in effect, a hollow body with a larger cross sectional area than the inlet and outlet ducts. The electrostatic precipitator further includes a plurality of energizable fields associated with one or more collecting plates longitudinally positioned next to one another within the hollow body where the plurality of energizable fields includes a first energizable field nearest the inlet. The electrostatic precipitator further includes a de-energizing mechanism for de-energizing the first energizable field(s) resulting in the separation of the lower density ash from the overall ash stream. The ESP is equipped with collection hoppers below the plurality of energizable fields. The ash falls out of the precipitator body, due to gravity, and is collected in the hoppers. Typically a hopper would span one collecting plate having one or more electrostatic fields associated therewith. The ash can be removed from individual hoppers or from rows of hoppers by modifying the existing transport system or by installing a separate system to extract the collected low density ash.

BRIEF DESCRIPTION OF THE DRAWINGS

Preferred embodiment of the invention, illustrative of the best mode in which applicant has contemplated applying the principles, is set forth in the following description and is shown in the drawings and is particularly and distinctly pointed out and set forth in the appended claims.

DESCRIPTION OF THE PREFERRED EMBODIMENT

The invention is a device and method of separating and collecting low density fly ash particles from the overall and unprocessed raw fly ash stream produced by coal burning in a coal fired, steam generating, electric power plant by setting out such low density fly ash particles from the raw coal ash stream using the de-energized inlet portion of an electrostatic precipitator as a separating device. This is specifically accomplished using a method and device that utilizes velocity deceleration to separate and collect the low density fly ash from the raw coal fly ash which will be collected by energized fields of the electrostatic precipitator.

Figure 1:
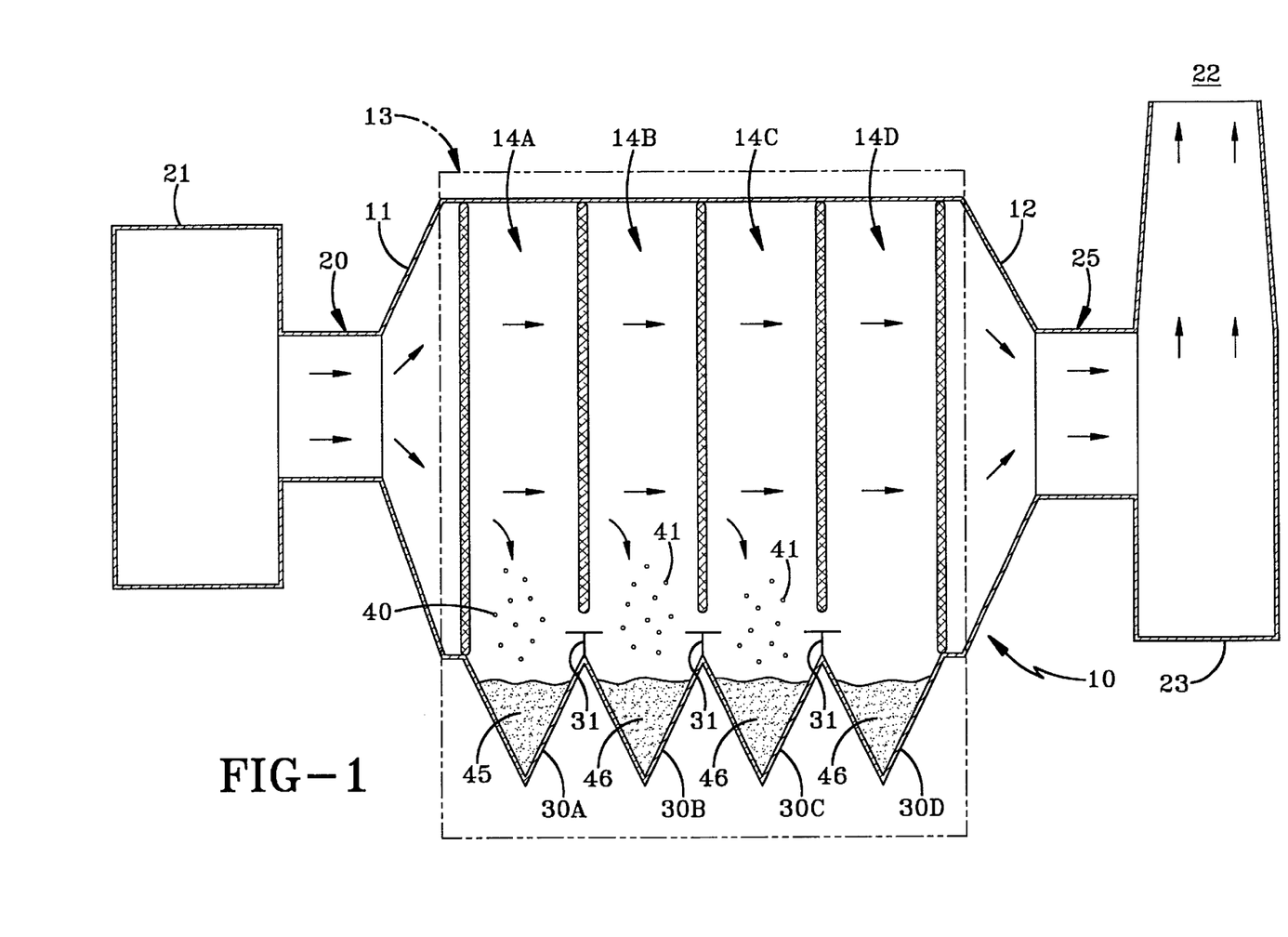
FIG. 1 is a sectional view of the electrostatic precipitator of the present invention.

The invention includes an electrostatic precipitator 10 as shown in one embodiment in FIG. 1. The electrostatic precipitator 10 generally includes an inlet or expansion nozzle 11, an outlet or outlet nozzle 12, and an enlarged hollow body 13 therebetween which is divided into multiple fields 14A, 14B, 14C, etc. that are energizable as described below. Many different varieties and constructions of electrostatic precipitators have been or are available on the market, all of which may incorporate this invention as described herein. The variety of precipitators available is large and includes, for example, models such as those described in the following U.S. Pat. Nos.: 1,298,409, 1,381,660, 3,898,060, 4,308,036, 4,374,652, and 5,160,510, as well as any other commercially available electrostatic precipitator.

In more detail, the electrostatic precipitator 10 is fluidly connected within an exhaust duct on a coal fired power plant that is between a combustor 21, or other combustion chamber, and a stack 23 which releases exhaust to the atmosphere 22. The exhaust duct is thus broken into an inlet duct 20, the precipitator 10, and an outlet duct 25. This is typically accomplished by cutting the exhaust duct into two pieces, namely a first section or inlet duct 20 and a second section or outlet duct 25, with the electrostatic precipitator 10 attached therebetween whereby the inlet duct 20 separates the combustor 21 from the electrostatic precipitator 10 while the outlet duct 25 separates the electrostatic precipitator 10 from the stack 23 and subsequently the atmosphere 22. An exhaust gas-to-air heat exchanger is typically used to preheat the air for combustion, and can be either on the inlet or outlet side of the precipitator, such as within the inlet duct 20 or the outlet duct 25.

The inlet and outlet ducts 20 and 25 are generally of a similar diameter and cross sectional area, while the diameter and cross-sectional area of the hollow body 13 is larger so as to substantially slow down the fluid flow therein due to an overall increase in volume. More particularly, the cross sectional area of hollow body 13 is in the range of from six to twenty-five times larger than the duct. More particularly, the large diameter of expansion nozzle 11 and hollow body 13 has an area at least ten times larger than the area associated with inlet duct 20. Basically, the flow or velocity of fluid, in the form of gas with particulate suspended therein, must be sufficiently slowed for the electrostatic precipitator to properly charge the particles, and this is accomplished by a significant increase in volume in the expansion nozzle 11 to the body 13. Thereafter, the flow is increased in the outlet nozzle 12 by decreasing the exhaust cross section. In one embodiment, the gas flow in the inlet duct 20 is approximately 60 ft./sec. while it falls to 2.5 to 5 ft./sec. in the precipitator body 13.

The electrostatic precipitator 10 is longitudinally subdivided into the fields between expansion nozzle 11 and outlet nozzle 12. As is standard for electrostatic precipitator, each field 14A, 14B, 14C, etc. includes one or more power supplies and each power supply is connected to one or more independently energizable portions known as bus sections. The number of fields is not important as the precipitator may only have a few or may have in excess of a dozen, while most standard precipitators have six or eight.

Per this longitudinal subdivision, the fields are aligned one after another from the expansion nozzle 11 to the outlet nozzle 12 with the first field 14A being adjacent or nearest the expansion nozzle 11, the second field 14B being next to the first field, and so on across the hollow body 13 to the outlet nozzle 12. Each field 14A, 14B, 14C, etc. is an arrangement of collecting surfaces and discharge electrodes as is well known in the art.

In use, the fields 14A, 14B, 14C, etc. are energized with high voltage by a transformer-rectifier combination that is electrically attached to a variety of controls and other electrical components. The energizing of the fields as the products of coal combustion in the form of exhaust gases with suspended particles pass through electrostatic precipitator 10 basically imparts a charge on the particles within the gas stream to separate out particles. This is well known in the industry as it has been in use for years, and ash separation from exhaust gas is required by environmental regulations. For these reasons, a large percentage of coal fired power plants have electrostatic precipitators on each exhaust duct after the combustor.

The electrostatic precipitator is positioned in a horizontal manner such that the gases must travel horizontally or approximately horizontally through it. This allows for particle fallout. Below or at the bottom of each field, or a collection of fields, is a hopper or collection chamber, namely hopper 30A for field 14A, hopper 30B for field 1 4B, etc. These hoppers are separated by walls 31. Each hopper basically collects any fall out that occurs above it as gases and particles pass through the precipitator and the specific field above it.

Electrostatic fields are created when the precipitator's charging wires are energized. Particles passing these charged wires are imparted with electrostatic charge. As a result, the charged particles are collected and later dislodged from grounded plates and the particles fall into the hoppers while the gaseous components of the flue gas pass through and are exhausted to the atmosphere 22.

Basically, only non-particulate matter passes all the way through the precipitator 10 to the outlet 12 and thus is exhausted to the atmosphere 22.

In accordance with one of the features of the invention, the electrostatic precipitator 10 is oversized. Oversized being defined as having excess capacity in that either lesser capacity or lesser number of fields are needed to fully remove the particles from the exhaust gases of the coal combustion process in order to meet environmental regulations. An oversized electrostatic precipitator 10 has fields that may be de-energized while still performing all of its particulate removal objectives.

In accordance with yet another feature of the invention, the first field 14A is de-energized by turning off the electric power to section 14A by operating breaker A or other similar device. As a result, a first area is provided in the precipitator body 13 that does not impart charges on the particles but is of a significantly increased cross sectional dimension, thus decelerating the exhaust gases containing the particles. In this first field when de-energized, a large portion of the low density ash 40 falls out into hopper 30A and accumulates as captured low density ash 45 while almost all of the higher density ash particles 41, due to greater momentum and less drag, pass into the next fields where they are charged and fall out into the hoppers 30B, 30C, etc. as captured higher density ash 46. The first hopper 30A may then be evacuated using a conveying system and the contents packaged as low density mineral material.

Referring specifically to the fly ash, it is, as stated, the dust-like material collected from the gas stream to be passed out of the stack, leaving the furnace of power plants which consume coal, and specifically powdered and pulverized coal. Chemically, fly ash is essentially a mixture of silica, aluminum oxide and other metal oxides containing minor proportions of alkalis and carbon. The carbon content of the fly ash represents that portion of the carbon of the original total that did not burn during the combustion in the furnace due to the short time of exposure of the coal to combustion temperatures and to inconsistencies in operation. Hence, depending on these and other factors, the fly ash may contain from as little as less than 1% to as high as even 40% by weigh of carbon in isolated instances. A typical fly ash analysis is as follows:

| | |
|---|---|
| Silica, $SiO_2$ | 54.6 |
| Aluminum Oxide, $Al_2O_3$ | 23.3 |
| Iron Oxide, $Fe_2O_3$ | 2.1 |
| Titanium Oxide, $TiO_2$ | 1.4 |
| Calcium Oxide, CaO | 0.4 |
| Magnesium Oxide, MgO | 0.5 |
| Sodium Oxide, $NA_2O$ | 0.2 |
| Potassium Oxide, $K_2O$ | 1.8 |
| Sulfur Trioxide, $SO_3$ | 0.3 |
| Phosphorous Pentoxide, $P_2O_5$ | <0.1 |
| Barium Oxide, BaO | <0.1 |
| Magnesium Oxide, $Mn_2O_3$ | <0.1 |
| Strontium Oxide, SrO | <0.1 |
| Total Carbon, C | 12.4 |
| Net Ignition Loss (+)/Gain (−) | +4.4 |
| Total | 101.4 |

Figure 2:
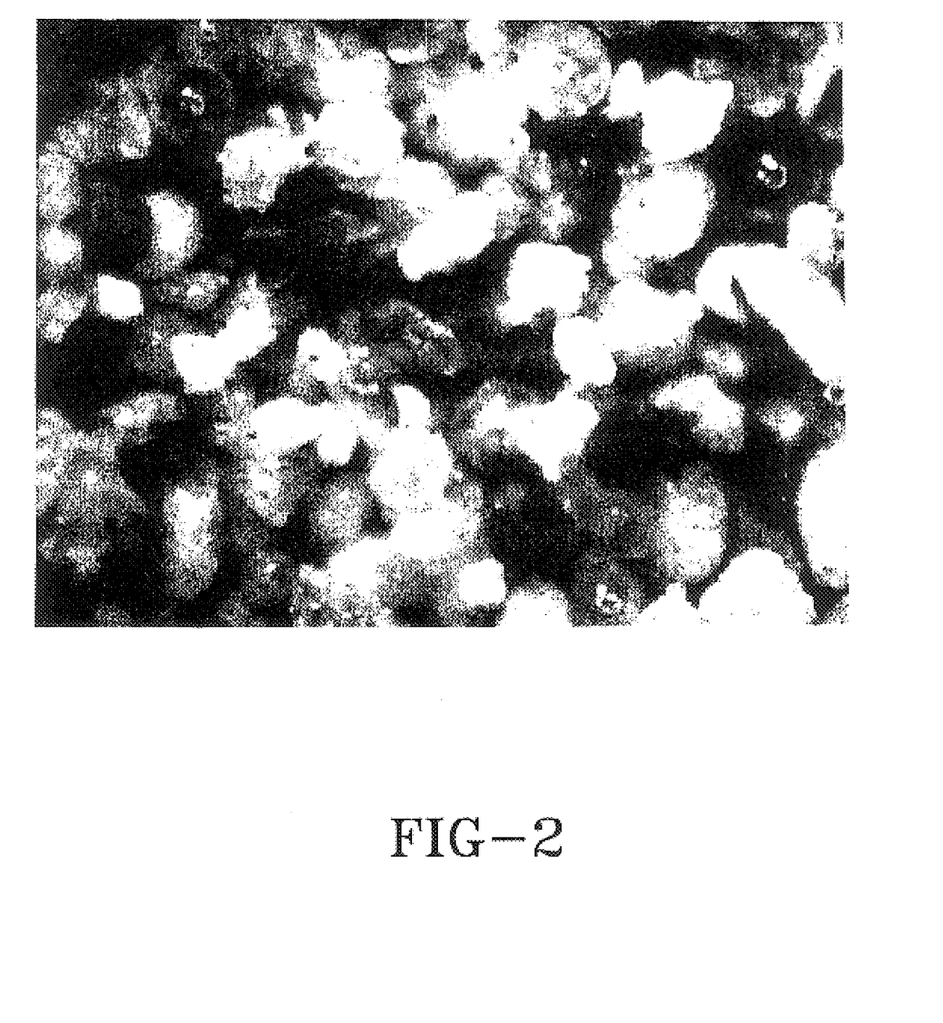
FIG. 2 is a photograph of the low density ash of the present invention.
Figure 3:
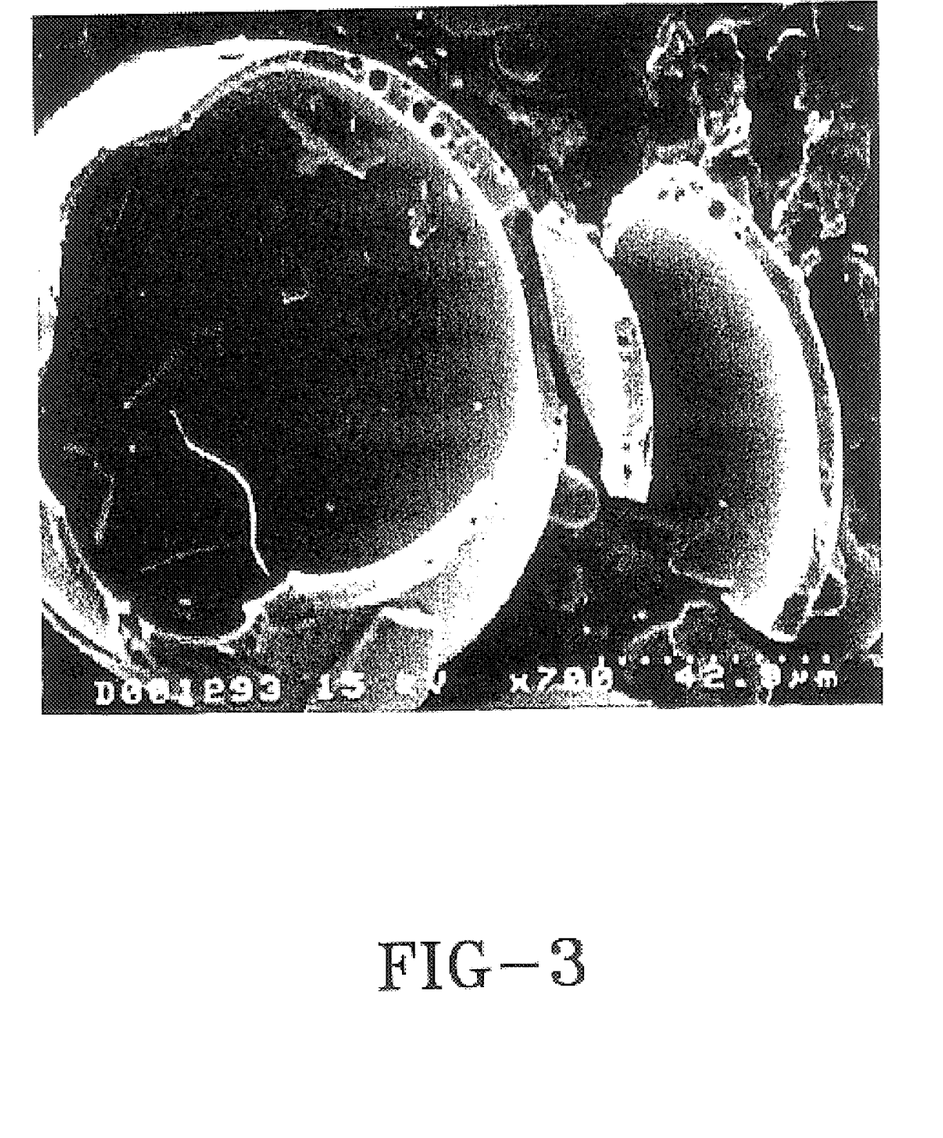
FIG. 3 is a photograph showing thick wall hollow particles having internal and external pores.
Figure 4:
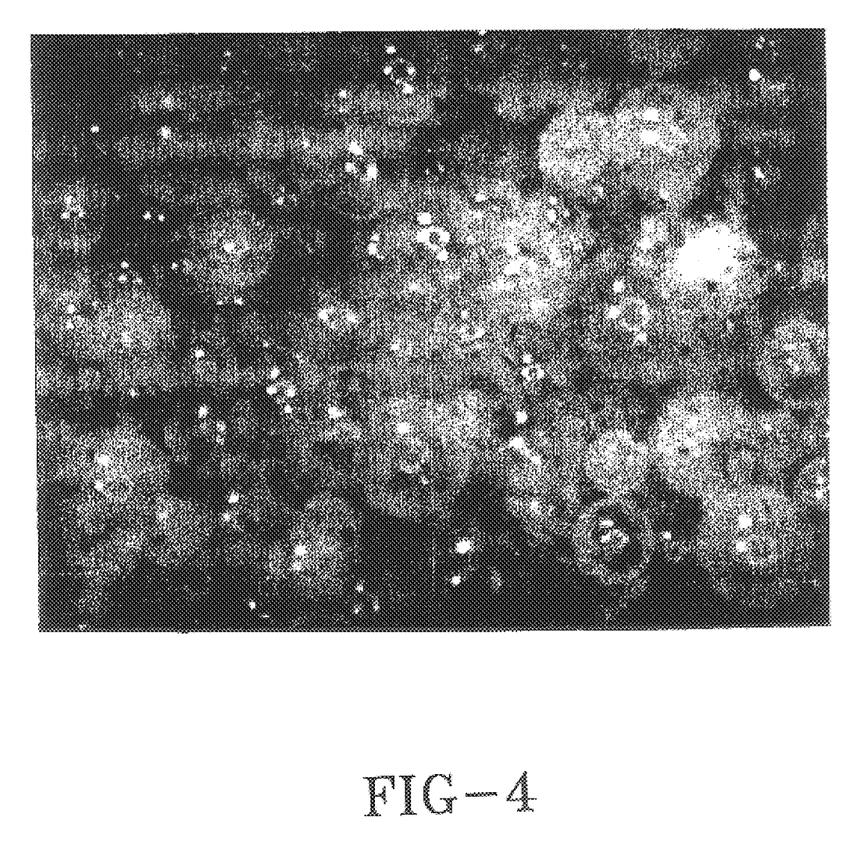
FIG. 4 is a photograph depicting cenospheres.
Figure 5:
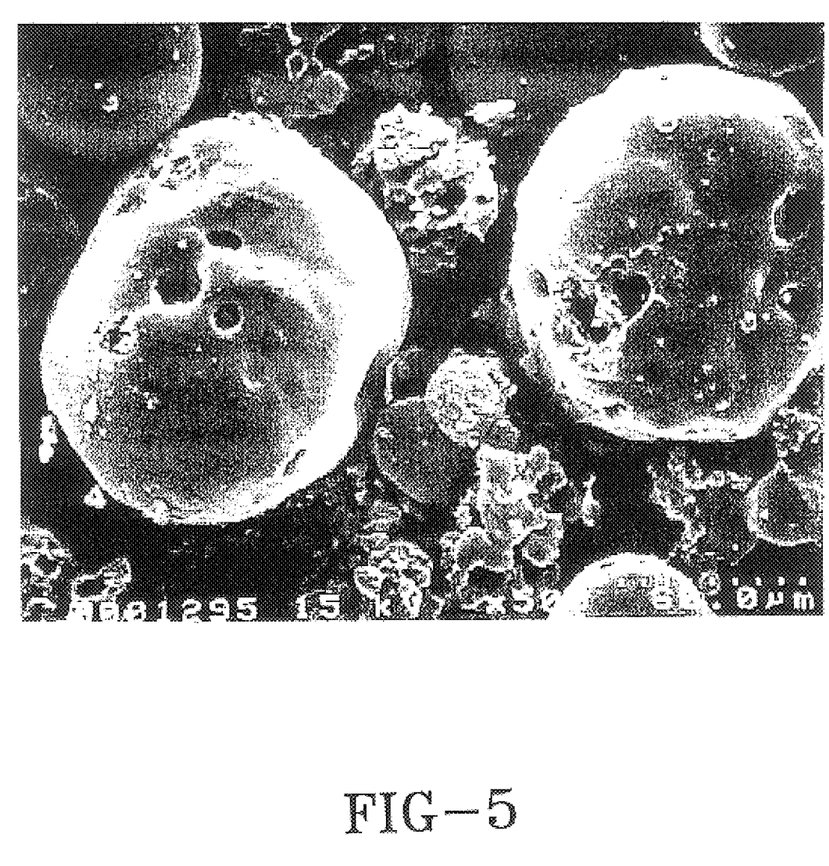
FIG. 5 is a photograph depicting solid low density particles.

Additionally, this mixture contains an available alkali equivalent $Na_2O$ of 0.33, and an Iron Oxide of $Fe_3O_4$ of 2.0. The low density ash of the present invention includes a major amount of frothy, solid particles with both internal and external porosity or interstitial cavities such as those shown on attached FIG. 2, and a minor amount of thick wall hollow particles as shown in FIG. 3 having both internal and external pores. Still further, a minor amount of cenospheres, such as those shown in FIG. 4 are also collected in the low density ash of the present invention. More particularly, the present invention includes from 10% to 70% of the total mixture by weight of frothy, solid particles such as those shown in FIG. 2, from 10% to 70% of thick walled hollow particles such as those shown in FIG. 3, and less than 1% of cenospheres such as those shown in FIG. 4. More particularly, and in one embodiment of the invention, the mixture of low density fly ash includes from 20% to 60% of frothy, solid particles and from 10% to 50% of thick walled hollow particles such as those shown in FIG. 3.

It has been found that the low density ash particles from the first hopper are of a significantly lower density than the other ash particles which tend to fall out in hoppers 30B, 30C, etc. The accumulation of material in the first hopper 30A is of a good quality and is of a high percentage, if not all, low density ash. The density of this accumulation in hopper 30A is at least 10% lower in density than raw fly ash normally produced by electrostatic precipitation, and it has been found to be 35% or more lower in density.

In experiments, the accumulation of material had a specific gravity of less than 2 and often is in the range of 1.6 to 1.99, which is a very good grade low density filler material. The vast majority of particles collected in hopper 30A were also about between 30 microns to 400 microns in size. It is also noted that the cost of collection of such low density ash from the first hoppers 30A is very low, far less than the costs associated with other processes to separate ash by particle size or density. Chemically, the composition of the low density ash particles is similar to the composition of the overall ash population passing in the gas stream, and is lower in density as a result of its frothy form and structure which has both internal and external porosity, which ensures that there is a relatively low density associated with the product.

In an alternative embodiment, the first and second fields 14A and 14B, or first three fields 14A–14C may be de-energized. In this case, low density fly ash is deposited in all three respective hoppers although a gradual increase in the density generally occurs in each successive field. Still further, the present invention may be operated by ensuring that expansion nozzle 11 has a cross sectional configuration large enough to decelerate the gas stream efficiently to ensure that lower density particles will fall out of the gas stream and into hopper 30A. In this manner, de-energizing the electrostatic precipitator is not necessary as the large diameter expansion nozzle 11 is sufficient to slow the gas stream and allow low density air entrained particles to fall out as a result of the drastic reduction in momentum. Expansion nozzle 11 may not be positioned adjacent an electrostatic precipitator, and simply decelerate the gas stream to allow low density particles to fall out of the stream. However, if expansion nozzle 11 is positioned adjacent a precipitator, then the collector plates must be de-energized to allow low density particles to fall.

Accordingly, the improved low density ash separation and collection method and device achieves all the enumerated objectives, does so with great cost efficiency and generates an entirely new low density fly ash material with unique properties and characteristics as a result of this new art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved low density ash separation and collection method and device is constructed and used, the characteristics of the construction, and the advantageous, new and useful results obtained; the new and useful structures, devices, elements, arrangements, parts and combinations, are set forth in the appended Claims.

What is claimed is:

1. An electrostatic precipitator for separating a low density fly ash faction from an overall group of fly ash entrained in a gas stream generated from the combustion of coal in a power generation facility and passing through the precipitator comprising:

an enlarged hollow body containing a plurality of adjacent areas having a gas inlet duct and gas outlet duct;

an expansion nozzle mounted between the inlet duct and a first area of the hollow body, said first area being larger than an area of the gas inlet duct to decelerate the gas stream in said first area so that the low density fly ash contained in the gas stream having a specific gravity of 2.0 or less is separated from the gas stream as the gas stream passes through the nozzle and first area of the hollow body;

a first hopper positioned adjacent the first area for collecting only the low density fly ash separated from the gas stream;

a plurality of energizable fields positioned within certain of the areas of the hollow body; and a mechanism for energizing certain of the energizable fields when the gas stream is passing through the precipitator except for the first area which is free of energization.

2. The electrostatic precipitator as defined in claim 1 in which the electrostatic precipitator has a first capacity defined by the maximum stream of overall fly ash flowing therethrough, and in which the electrostatic precipitator is oversized in capacity relative to the first capacity.

3. The electrostatic precipitator as defined in claim 1 in which the overall group of fly ash in the gas stream has a first density, and in which the low density fly ash collected in the first hopper at least ten (10) percent lower in density than the first density of the group of fly ash.

4. The electrostatic precipitator as defined in claim 1 in which the overall group of fly ash has a first density, and in which the low density fly ash collected is at least thirty-five (35) percent lower in density than the first density of the group of fly ash.

5. The electrostatic precipitator as defined in claim 1 in which the low density fly ash has a specific gravity in the range of from 1.6 to 1.99.

6. The electrostatic precipitator as defined in claim 1 in which the low density fly ash collected in the hopper consists of a major amount of solid particles having internal and external porosity and a minor amount of hollow particles having internal and external porosity.

7. The electrostatic precipitator as defined in claim 1 in which the low density fly ash collected in the hopper is sized predominantly in the range of from between 30 microns to 400 microns.

* * * * *